Nov. 17, 1936.   C. W. LARNER ET AL   2,061,239
VALVE
Filed July 24, 1935
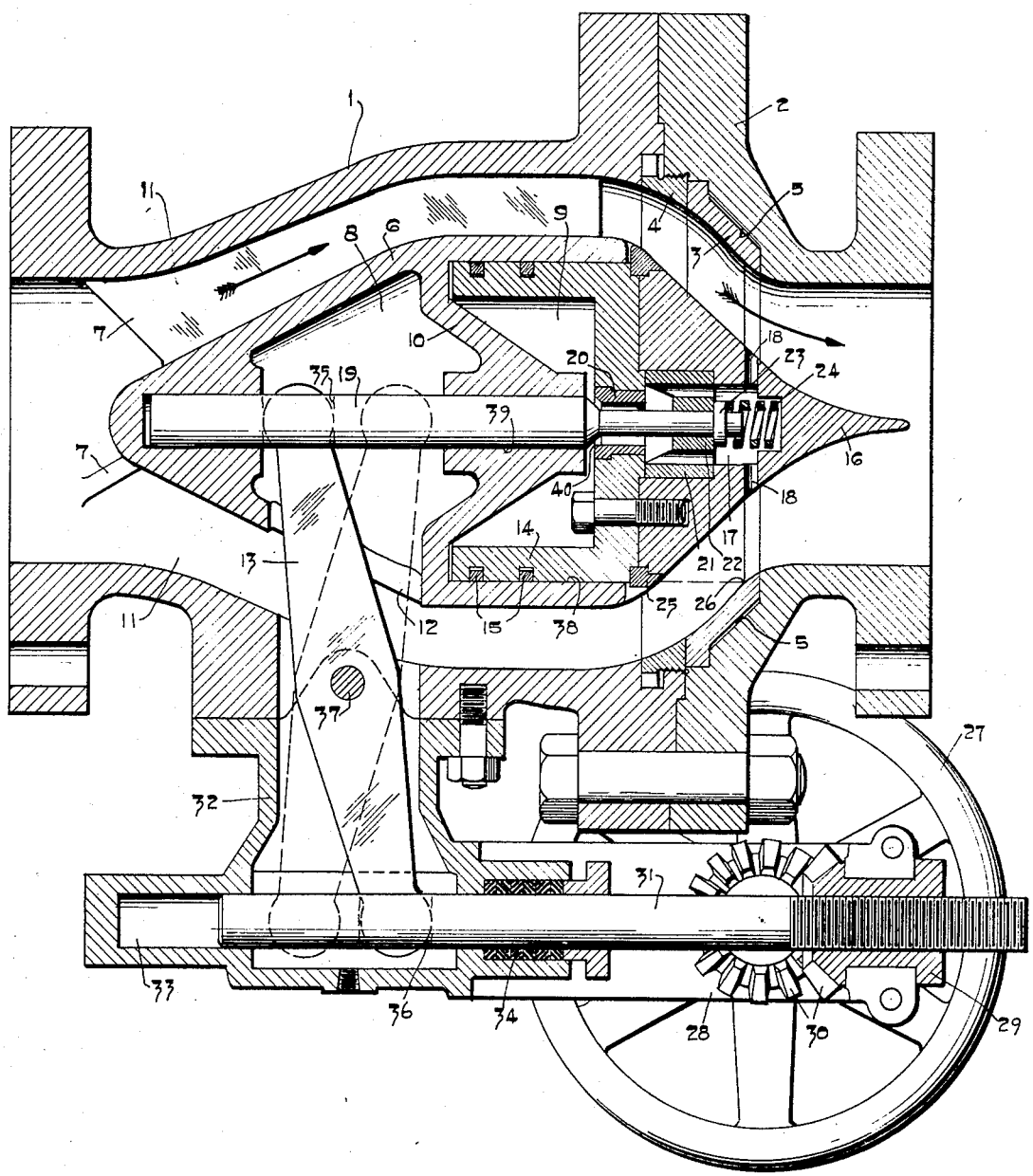
INVENTORS
Chester W. Larner
BY Otto V. Kruse
ATTORNEY Patented Nov. 17, 1936

2,061,239

UNITED STATES PATENT OFFICE 2,061,239

VALVE

Chester W. Larner, Philadelphia, and Otto V. Kruse, St. Davids, Pa., assignors to Baldwin-Southwark Corporation, a corporation of Delaware Application July 24, 1935, Serial No. 32,832

9 Claims. (Cl. 137—139)

This invention relates in general to valve mechanisms of the plunger or needle type, adapted to control the flow of fluids in pipe lines and particularly to control the flow of expansive or elastic fluids, such, for example, as steam, air and various gases.

In the past, valves of this type which have operated satisfactorily when controlling the flow of liquids, have been unsatisfactory when used with expansive fluids due to the elasticity of the fluid acting upon the inner and outer surfaces of the plunger. This has frequently given rise to unstable pressure conditions which have caused chattering and hammering of the plunger against contiguous parts. It is one object of the invention to provide improved means for overcoming this difficulty and this is accomplished in one aspect of the invention by the provision of positive means of holding the plunger mechanically so that it is not free to vibrate as in the case of prior mechanisms.

Another object of this invention is to provide valve mechanisms of the above described characteristics which are substantially balanced during operation so that the external force required to operate the plunger is minimized, making such valves suitable for either hand control or remote electrical or automatic control.

Other objects and advantages will be apparent from the following description of the drawing.

The figure is a sectional view of a valve designed for installation in a straight run of pipe. This drawing shows in section a hand mechanism for operating the plunger.

In the drawing referred to, there is an outer casing or body made in two parts, 1 and 2, the latter portion being provided with a ring 3 which forms a seat for a plunger 14. Ring 3 is retained in position by a lock ring 4 which screws into 2. There is a substantial clearance space 5 between seat ring 3 and the body 2, this space being provided in order to give some flexibility to ring 3 in order that it may accommodate itself to perfect contact with the plunger and also to prevent, so far as possible, distortion or displacement of the downstream end of ring 3 as a result of expansion and contraction of the body 2.

An internal cylinder 6 is connected to the body 1 by suitable radial ribs 7. Internal cylinder 6 is divided into two chambers 8 and 9 by a partition 10. Chamber 8 is open to a fluid passageway 11, an opening 12 being provided to accommodate a rocker bar 13 which connects the internal mechanism of the valve to the external operating gear.

The downstream end of internal cylinder 6 is bored to fit the outside circumference of plunger 14, which slides axially in this bore between the open and closed positions. Plunger 14 may or may not be provided with piston rings 15 according to whether or not they are necessary in order to minimize leakage between the passageway 11 and chamber 9.

Plunger 14 is provided with a plunger nose 16 containing a chamber 17 which is connected to the fluid passageway by ports 18.

The movement of the plunger is controlled by the movement of a pilot valve 19. Plunger 14 is provided with a ring 20 against which pilot valve 19 seats to control the flow of fluid from chamber 9 through ports 18 to the fluid way 11. A ring 21 is set into a counterbore in the plunger nose 16 and by means of radial ribs supports a bearing 22 for the pilot valve 19. Bearing 22 serves as an abutment for a collar 23 on the pilot valve during the opening movement of the plunger. A heavy spring 24 is inserted between collar 23 and the plunger nose 16 and tends at all times to push the pilot valve away from the plunger and maintain an open passage between chamber 9 and fluid way 11. The plunger is provided with a seat ring 25 which seats against the ring 3 at a point 26 which is in line with the fit between internal cylinder 6 and plunger 14 as indicated by a broken line. The purpose of making the seat the same size as plunger 14 is to secure a balance in an axial direction between the forces on the downstream nose of the plunger and the force in chamber 9 whenever the unit pressures in these two regions are equalized by the opening of the pilot valve.

The external operating mechanism consists of a handwheel 27, or electric motor adapted for remote control, mounted on a shaft carried by a yoke 28 and connected to a threaded nut 29 by means of bevel gears 30. This mechanism is not shown in complete detail because it is of conventional design well known in the art. The yoke 28 is made in halves and clamps around the nut 29 with a free fit so that nut 29 can rotate and the thrust in both directions is transmitted to the yoke. The result of this arrangement is that when nut 29 is rotated by the handwheel it moves a threaded bar 31 in an axial direction. A housing 32 is attached to valve body 1 accommodating the outer end of rocker bar 13 and providing a guide bearing 33 and a stuffing box 34 for rod 31.

Both ends of rocket bar 13 are of circular form and project through a slot 35 in pilot 19 and a similar slot 36 in rod 31. Rocker bar 13 is pivoted on a pin 37 and by means of this arrangement it is obvious that axial movement of bar 31 produces axial movement in the opposite direction of pilot valve 19.

*In operation.*—To close the valve from the open position shown, rod 31 is moved to the left by means of handwheel 27. This moves pilot valve 19 to the right and the plunger with it, due to the pressure of spring 24 which prevents movement of pilot valve 19 relative to the plunger. The pilot valve and plunger move together as though rigidly connected until seat ring 25 makes contact with seat ring 3. During this closing stroke, fluid is supplied to chamber 9 by leakage through the clearance spaces 38 and 39 or some fluid may flow backward through ports 18. During the stroke, the pilot valve is fully open and the upstream and downstream pressures against the plunger will be substantially equalized if the passages through the plunger are of adequate area.

After the plunger is seated, further movement of the pilot valve compresses spring 24 and gradually cuts off flow through the plunger until the pilot valve makes contact with its seat 40. The pilot valve now being closed and the plunger closed, all flow through the valve is cut off.

To open the valve the pilot valve 19 is moved to the left until it is fully unseated or nearly so. This permits the escape of pressure in chamber 9 into the downstream fluid way until the pressure downstream of the valve is equal to the pressure upstream. This is a very convenient means of slowly heating the downstream pipeline in the case of a steam valve. During this priming period the plunger is held against seat ring 3 by the pressure of spring 24 so there is no tendency for the plunger to chatter or hammer against its seat, due to momentary fluctuations of the pressures acting upon the plunger.

After the downstream pipe is primed or in the event that the valve is opened to atmospheric pressure at the downstream end or to a region of pressure lower than the upstream pressure, the leftward movement of the pilot valve is resumed and it pulls the plunger with it, due to the abutment of collar 23 against bearing 22. The force required to move the plunger, however, is comparatively small, just as in the case of the closing movement, due to the fact that the pilot valve is fully opened and the pressure in chamber 9 is equalized through ports 18 with the pressure on the downstream nose of the plunger. When the opening stroke is completed, all of the parts are in the positions shown by the drawing.

When the valve is used with inelastic fluids, such as liquids, spring 24 may sometimes be omitted, particularly if the valve has a free discharge so there are no violent fluctuations of pressure on the downstream end of the plunger while it is in motion. It is obvious that with a liquid the plunger cannot move relative to the pilot valve except as flow takes place from chamber 9 through the plunger. Such flow takes appreciable time and it is thus obvious that the plunger cannot vibrate in an axial direction causing a fluttering motion and hammering against the pilot valve or against ring 3 if it happens to be within reach of it.

With an elastic fluid such as steam, however, it is possible for the plunger to move relative to the pilot valve without flow either into or out of chamber 9. The expansion or contraction of the fluid in chamber 9 will permit such motion if spring 24 is omitted even though the differences of up and downstream pressures against the plunger are of comparatively small magnitude. When spring 24 is used, however, it is obvious that any tendency would have to be of sufficient magnitude to overcome the effect of spring 24. These unbalanced tendencies can be minimized by making passages through the plunger of liberal size and spring 24 may be made quite stiff and put under heavy initial tension so that under all conditions ordinarily encountered this arrangement effectually eliminates hammering or chattering.

The invention is not necessarily limited to a straight way arrangement. It may be used with an elbow at the inlet end of the valve, the pilot valve 19 being carried through a stuffing box on the elbow and operated by various means well-known in connection with similar arrangements in the art.

It will of course be understood that various changes in details of construction and arrangement of parts may be made by those skilled in the art without departing from the spirit of the invention as set forth in the appended claims.

We claim:

1. A valve mechanism comprising, in combination, inner and outer annular casings spaced to form an annular fluid passageway, a movable plunger valve telescopically arranged with respect to said inner casing for axial movement to open and close said passageway, means forming a fluid pressure operating chamber therefor, a source of operating fluid, a pilot valve controlled passage for the operating fluid of said chamber, and means whereby during closing movement of the valve plunger said pilot valve remains open but is closed after said valve plunger is closed.

2. A valve mechanism comprising, in combination, inner and outer annular casings spaced to form an annular fluid passageway, a movable plunger valve telescopically arranged with respect to said inner casing for axial movement to open and close said passageway, means forming a fluid pressure operating chamber therefor, a pilot valve controlled passage for the operating fluid of said chamber, and means whereby said valve plunger is moved to its closed position by movement of the pilot valve while the latter remains in its open position and after closure of said plunger valve said pilot valve is adapted to continue to move to its closed position.

3. A valve mechanism comprising, in combination, inner and outer annular casings spaced to form an annular fluid passageway, a movable plunger valve telescopically arranged with respect to said inner casing for axial movement to open and close said passageway, means forming a fluid pressure operating chamber therefor, a pilot valve controlled passage for the operating fluid of said chamber, and means whereby said valve plunger is moved to its closed position by movement of the pilot valve while the latter remains in its open position and after closure of said plunger valve said pilot valve is adapted to continue to move to its closed position, said latter means including means movable with the plunger for restraining closure of the pilot valve during closing movement of the valve plunger.

4. A valve mechanism comprising, in combination, inner and outer annular casings spaced to form an annular fluid passageway, a movable plunger valve telescopically arranged with respect to said inner casing for axial movement to open and close said passageway, means forming a fluid pressure operating chamber therefor, a pilot valve controlled passage for the operating fluid of said chamber, and means whereby said valve plunger is moved to its closed position by movement of the pilot valve while the latter remains in its open position and after closure of said plunger valve said pilot valve is adapted to continue to move to its closed position, said latter means including yieldable means for resisting relative movement between the pilot valve and the valve plunger during said closing movement of the latter but permitting relative movement after the valve plunger is closed thereby effecting said closure of the pilot valve.

5. A valve mechanism comprising, in combination, inner and outer annular casings spaced to form an annular fluid passageway, a movable plunger valve telescopically arranged with respect to said inner casing for axial movement to open and close said passageway, means forming a fluid pressure operating chamber therefor, a pilot valve controlled passage for the operating fluid of said chamber adapted when open to effect substantial equalization of pressures on opposite sides of the valve plunger, and means whereby said valve plunger is mechanically moved to its closed position by movement of the pilot valve while the latter remains in its open position and after closure of said plunger valve said pilot valve is adapted to continue to move to its closed position.

6. A valve mechanism comprising, in combination, inner and outer annular casings spaced to form an annular fluid passageway, a movable plunger valve telescopically arranged with respect to said inner casing for axial movement to open and close said passageway, means forming a fluid pressure operating chamber therefor, a pilot valve controlled passage for the operating fluid of said chamber, and means whereby said valve plunger is moved to its closed position by movement of the pilot valve while the latter remains in its open position and after closure of said plunger valve said pilot valve is adapted to continue to move to its closed position, said latter means including means for retaining said plunger in its closed position during initial opening of the pilot passage.

7. Valve mechanism comprising inner and outer cylinders spaced to form an annular fluid passageway, a plunger telescopically arranged with respect to said inner cylinder for axial movement to open or close said passageway, means forming a fluid operating chamber for said plunger, a passage extending through said plunger for allowing communication between said chamber and the pipe line in which the valve mechanism is disposed whereby fluid in the pipe line is adapted to be supplied to said operating chamber, a pilot valve for controlling said communicating passage, and means whereby said plunger is moved to its open and closed positions by movement of said pilot valve but requires closure of the plunger before the pilot valve may close and requires opening of the pilot valve before the plunger is unseated.

8. A valve mechanism comprising, in combination, inner and outer annular casings spaced to form an annular fluid passageway having coaxial inlets and outlets, a movable plunger valve telescopically arranged with respect to said inner casing for axial movement to open and close said passageway, means forming a fluid pressure operating chamber therefor, a pilot valve controlled passage for the operating fluid of said chamber, and a spring interposed between said pilot valve and plunger whereby during closure of the valve element said pilot valve remains open but is closed after said valve element is closed.

9. Valve mechanism comprising inner and outer cylinders spaced to form an annular fluid passageway having coaxial inlets and outlets, a plunger telescopically arranged with respect to said inner cylinder for axial movement to open or close said passageway, means forming a fluid operating chamber for said plunger, a passage extending through said plunger for allowing communication between said chamber and the pipe line in which the valve mechanism is disposed, a pilot valve for controlling said communicating passage, and means including a spring interposed between said pilot valve and plunger whereby said plunger is moved to its open and closed positions by movement of said pilot valve but requires closure of the plunger before the pilot valve may close and requires opening of the pilot valve before the plunger is unseated.

CHESTER W. LARNER.
OTTO V. KRUSE.